Patented Jan. 30, 1945

2,368,580

UNITED STATES PATENT OFFICE 2,368,580

PROCESSES FOR THE PRODUCTION OF TUNGSTIC ACID

Gustav A. Stein, Plainfield, and William J. Moran, Jr., Cranford, N. J., assignors to Merck & Co., Inc., Rahway, N. J., a corporation of New Jersey No Drawing. Application October 25, 1941, Serial No. 416,602

5 Claims. (Cl. 23—140)

This invention relates to processes for the production of tungstic acid.

Tungstic acid may be prepared from a crude tungstate which contains more or less considerable quantities of other heavy metals, including molybdenum which has been considered particularly difficult to remove.

We have discovered that reagent tungstic acid may be prepared from such crude tungstates substantially free from accompanying heavy metals, and in practically quantitative yield, by a simple, economical process which is adapted to large scale manufacturing operations.

According to our invention, a hot aqueous solution of a crude tungstate, say sodium tungstate, is treated with hydrogen sulfide in the presence of an acid having the general properties of α-hydroxy acids, the pH of the solution being adjusted to a value between 3.5–4.5, molybdenum trisulfide and the sulfides of other accompanying heavy metals, are filtered off, and the tungstic acid is precipitated with hot hydrochloric acid.

In the process of our invention, the use of the expensive tartaric acid, hitherto indicated as essential for a sharp separation, may be avoided; relatively inexpensive and readily recoverable acids may be employed; for example, α-hydroxy, mono-basic aliphatic acids such as lactic acid and α hydroxy tri-basic aliphatic acids such as citric acid are entirely satisfactory. Also, contrary to the teachings of the prior art, removal of molybdenum according to our method, does not require repeated treatments with hydrogen sulfide.

The tungstic acid according to our invention is practically free from iron and heavy metal (molybdenum, etc.) content.

The following examples illustrate methods of carrying out the present invention, but it is to be understood that these examples are given by way of illustration and not of limitation.

Example I

Six kg. of crude sodium tungstate ($Na_2WO_4.2H_2O$)

are dissolved in 12 liters of distilled water. 9.9 liters of a freshly prepared 30% sodium hydroxide solution are added, and the resulting cloudy yellowish solution is shaken with 30 gms. of acid-washed charcoal (Darco G 60) and filtered by suction. A sparkling water-clear solution is obtained.

4.8 kg. of citric acid U. S. P. XI are dissolved in 4.8 liters of distilled water, treated with 5 gms. of acid-washed charcoal, and filtered by suction. This clear solution is added to the alkali sodium tungstate solution and the whole adjusted to a pH of 3.9–4.0 by the addition of 5.4 liters of reagent hydrochloric acid (1.19).

The solution is then gassed with hydrogen sulfide for about seven to ten hours, at about 70° C. After standing for about 12 hours, the reaction mixture is treated with 15 gms. of acid-washed charcoal, and filtered by suction. The clear somewhat amber-colored filtrate is allowed to stand about 12 hours on a steam bath, after which it is treated again with 15 gms. of acid-washed charcoal (Darco), and after vigorous stirring, the solution is filtered by suction, and the clear filtrate re-filtered to remove last traces of charcoal. A sparkling clear water-white solution is obtained. The solution is heated to about 80° C., and is poured into a hot (80°) mixture of 15.8 liters of concentrated reagent hydrochloric acid (sp. gr. 1.19), and 15.82 liters of water, with good stirring. After settling, the clear supernatant liquor is siphoned off. The mother liquor containing the citric acid may be used for another batch, or the citric acid may be recovered quantitatively. The tungstic acid is washed free of chloride with water containing 0.03% by volume of nitric acid. The nitric acid is removed by heating the tungstic acid slurry in vacuo. The tungstic acid is then moistened with water, 100–200 cc. of superoxol are added, and the product dried in vacuo.

Example II

Six kg. of sodium tungstate ($Na_2WO_4.2H_2O$) are dissolved in 12 liters of distilled water. 10.4 liters of a freshly prepared 30% sodium hydroxide solution are added. The resulting cloudy yellowish solution is shaken with 30 gms. of acid-washed charcoal (Darco G 60), and filtered by suction. A sparkling water-clear solution is obtained.

A solution of 7.2 kg. of lactic acid dissolved in 4.4 liters of distilled water is treated with 5 gms. of acid-washed charcoal and filtered by suction. This clear solution is added to the alkali sodium tungstate solution, and adjusted to a pH of 3.9–4.0 by the addition of 5.4 liters of reagent hydrochloric acid (1.19).

The solution is then gassed with hydrogen sulfide for about seven to ten hours, at about 70° C. After standing for about 12 hours, the reaction mixture is treated with 15 gms. of acid-washed charcoal, and filtered by suction. The clear somewhat amber-colored filtrate is allowed to stand for about 12 hours on a steam bath, after which it is treated again with 15 gms. of acid-washed charcoal (Darco), and after vigorous stirring, the solution is filtered by suction, and the clear filtrate re-filtered to remove last traces of charcoal. A sparkling clear water-white solution is obtained. The solution is heated to about 80° C., and is poured into a hot (80°) mixture of 15.8 liters of concentrated reagent hydrochloric acid (1.19), and 15.82 liters of water, with good stirring. After settling, the clear supernatant liquor is siphoned off. The tungstic acid is washed free of chloride with water containing 0.03% by volume of nitric acid. The nitric acid is removed by heating the tungstic acid slurry in vacuo. The tungstic acid is then moistened with water, 100-200 cc. of aqueous hydrogen peroxide (30%) are added, and the product dried in vacuo.

Modifications may be made in carrying out the present invention, without departing from the spirit and scope thereof, and we are to be limited only by the appended claims.

We claim:

1. In a process for the production of substantially pure tungstic acid, the step comprising treating a crude tungstate in aqueous solution with hydrogen sulfide, in the presence of a substance selected from the group consisting of α-hydroxy mono-basic aliphatic acids and α-hydroxy tri-basic aliphatic acids, and at a pH of 3.5-4.5, and at a temperature of about 70° C.

2. In a process for the production of substantially pure tungstic acid, the step comprising treating a crude tungstate in aqueous solution with hydrogen sulfide in the presence of an α-hydroxy mono-basic aliphatic acid, and at a pH of 3.5-4.5, and at a temperature of about 70° C.

3. In a process for the production of substantially pure tungstic acid, the step comprising treating crude sodium tungstate in aqueous solution with hydrogen sulfide in the presence of lactic acid, and at a pH of 3.5-4.5, and at a temperature of about 70° C.

4. In a process for the production of substantially pure tungstic acid the step comprising treating a crude tungstate in aqueous solution with hydrogen sulfide in the presence of an α-hydroxy tri-basic aliphatic acid, and at a pH of 3.5-4.5, and at a temperature of about 70° C.

5. In a process for the production of substantially pure tungstic acid the step comprising treating crude sodium tungstate in aqueous solution with hydrogen sulfide in the presence of citric acid, and at a pH of 3.5-4.5, and at a temperature of about 70° C.

GUSTAV A. STEIN.
WILLIAM J. MORAN, Jr.